(12) United States Patent
Mittelsteadt et al.

(10) Patent No.: US 8,971,463 B2
(45) Date of Patent: Mar. 3, 2015

(54) CHANNEL ESTIMATION IN A COMMUNICATIONS SYSTEM

(75) Inventors: Cimarron Mittelsteadt, Santa Clarita, CA (US); Cheng-Chou Lan, Los Angeles, CA (US)

(73) Assignee: ViXS Systems, Inc., Toronto, Ontario (CA)

( * ) Notice: Subject to any disclaimer, the term of this patent is extended or adjusted under 35 U.S.C. 154(b) by 425 days.

(21) Appl. No.: 13/299,751

(22) Filed: Nov. 18, 2011

(65) Prior Publication Data
US 2013/0128995 A1    May 23, 2013

(51) Int. Cl.
| | |
|---|---|
| H04L 25/08 | (2006.01) |
| H04L 27/26 | (2006.01) |
| H04L 25/02 | (2006.01) |
| H04L 25/03 | (2006.01) |
| H04B 17/00 | (2006.01) |
| H04L 1/20 | (2006.01) |
| H04L 5/00 | (2006.01) |

(52) U.S. Cl.
CPC ........... *H04L 27/2689* (2013.01); *H04L 5/0048* (2013.01); *H04L 25/0204* (2013.01); *H04L 25/03159* (2013.01); *H04L 27/2613* (2013.01); *H04L 27/2657* (2013.01); *H04L 27/2662* (2013.01); *H04L 2025/03414* (2013.01); *H04B 17/0055* (2013.01); *H04L 25/022* (2013.01); *H04L 25/0228* (2013.01); *H04L 1/206* (2013.01); *H04B 17/007* (2013.01); *H04L 27/2672* (2013.01)

USPC .......................................... 375/346; 375/316

(58) Field of Classification Search
USPC ................... 375/346–349; 370/203, 208, 210
See application file for complete search history.

(56) References Cited

U.S. PATENT DOCUMENTS

| | | | |
|---|---|---|---|
| 7,295,144 B1* | 11/2007 | Karthik et al. | 341/200 |
| 2002/0021750 A1* | 2/2002 | Belotserkovsky et al. | 375/232 |
| 2005/0135324 A1* | 6/2005 | Kim et al. | 370/343 |
| 2008/0181323 A1* | 7/2008 | Waters et al. | 375/260 |
| 2010/0027702 A1* | 2/2010 | Vijayan et al. | 375/267 |

OTHER PUBLICATIONS

CTE Implication Paper, "The Challenges and Rewards of MoCA Deployment for the Home Network," An Implication paper prepared for the Society of Cable Telecommunications Engineers by Spirent Communications, http://mocalliance.org/marketing/white_papers/Spirent_white_paper.pdf, pp. 1-29, downloaded Aug. 30, 2011.

(Continued)

*Primary Examiner* — Vineeta Panwalkar
*Assistant Examiner* — Janice Tieu
(74) *Attorney, Agent, or Firm* — Abel Law Group, LLP

(57) ABSTRACT

A method includes generating representative noise variance estimates based on a plurality of received symbols received in an orthogonal frequency division multiplexing (OFDM) signal. The representative noise variance estimates correspond to respective frequency intervals of a plurality of frequency intervals of the OFDM channel. Individual frequency intervals of the plurality of frequency intervals include a plurality of contiguous frequency bins of the OFDM signal.

22 Claims, 9 Drawing Sheets

(56) References Cited

OTHER PUBLICATIONS

Chow, Peter S., et al., "DMT-Based ADSL: Concept, Architecture, and Performance," The Institute of Electrical Engineers, 1994, 6 pages, IEE, London, UK.

Negi, Rohit and Cioffi, John, "Pilot Tone Selection for Channel Estimation in a Mobile OFDM System," IEEE Transactions on Consumer Electronics, vol. 44, No. 3, Aug. 1998, pp. 1122-1128.

Ovadia, Shlomo, "Home Networking on Coax for Video and Multimedia," Overview for IEEE 802.1AVB, Multimedia over COAX Alliance, May 30, 2007, pp. 1-15.

* cited by examiner

CHANNEL ESTIMATION IN A COMMUNICATIONS SYSTEM

BACKGROUND

1. Field of the Invention

The present invention relates to communications systems, and more particularly, to channel estimation in communications systems.

2. Description of the Related Art

In a typical digital communications system, the channel is bandlimited and disperses a signal passing through the channel. When the channel bandwidth is greater than the bandwidth of the signal, signal spreading is negligible. However, when the channel bandwidth is close to the signal bandwidth, signal spreading can exceed a symbol duration and results in intersymbol interference, i.e., overlapping of symbols, which interferes with the detection process at the receiver and degrades system performance (e.g., increases system error rates). Unlike other forms of noise, intersymbol interference cannot be remedied by increasing transmit signal power. Since the frequency response of the channel is typically not known with sufficient precision to allow for a receiver design that will compensate for intersymbol interference for all time, a filter (i.e., an equalization filter) corrects the channel-induced distortion at the receiver using parameters that are adjusted based on estimates of channel characteristics.

SUMMARY OF EMBODIMENTS OF THE INVENTION

In at least one embodiment of the invention, a method includes generating representative noise variance estimates based on a plurality of received symbols received over an orthogonal frequency division multiplexing (OFDM) signal. The representative noise variance estimates correspond to respective frequency intervals of a plurality of frequency intervals of the OFDM signal. Individual frequency intervals of the plurality of frequency intervals include a plurality of contiguous frequency bins of the OFDM signal.

In at least one embodiment of the invention, a receiver includes a noise variance estimator configured to generate representative noise variance estimates based on a plurality of received symbols received in an orthogonal frequency division multiplexing (OFDM) signal. The representative noise variance estimates correspond to respective frequency intervals of a plurality of frequency intervals of the OFDM signal. Individual frequency intervals of the plurality of frequency intervals include a plurality of contiguous frequency bins of the OFDM signal. The receiver includes a frequency equalizer coefficient generator configured to generate frequency domain equalizer coefficients based on the representative noise variance estimates.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
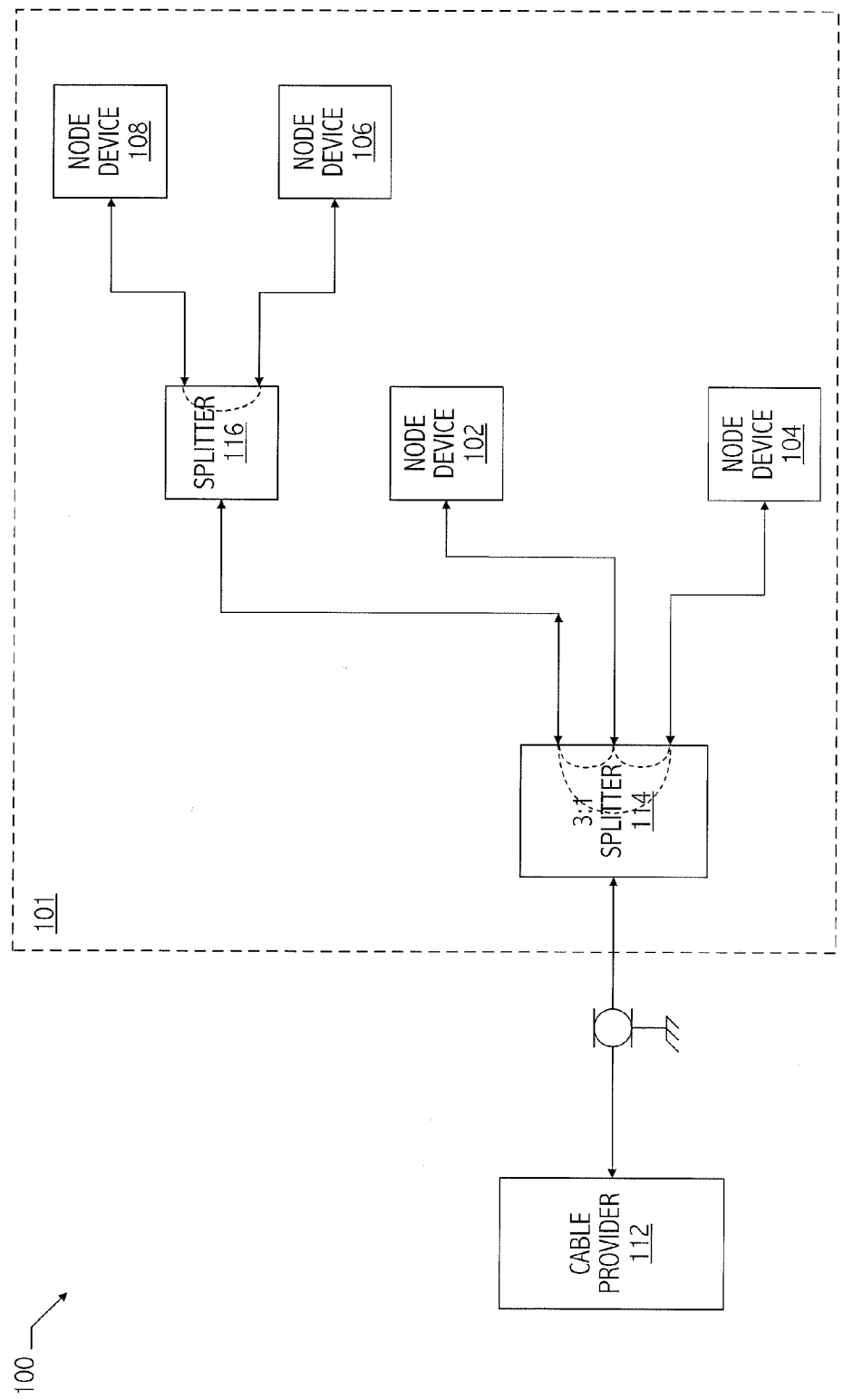
FIG. 1 illustrates a functional block diagram of an exemplary communications system.

Referring to FIG. 1, in an exemplary digital communications network (e.g., network 100) nodes (e.g., nodes 102, 104, 106, and 108) and splitters (e.g., splitters 114 and 116) are configured as a local area network (e.g., network 101) using communications over a channel (e.g., coaxial cables). In at least one embodiment of network 100, nodes 102, 104, 106, and 108 communicate with a wide-area network (e.g., cable provider 112) via splitter 114 and/or splitter 116. In addition, in at least one embodiment of network 100, nodes 102, 104, 106, and 108 communicate with each other via splitter jumping.

Figure 2:
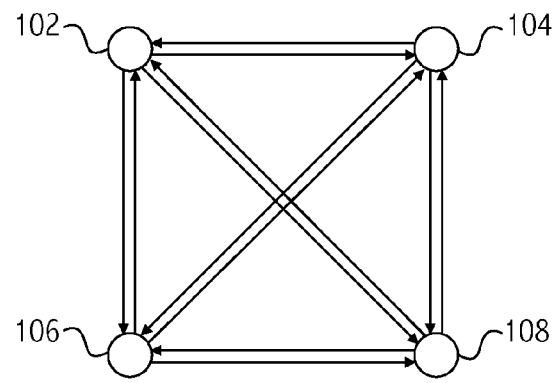
FIG. 2 illustrates an exemplary logical topology of node devices of the communications system of FIG. 1.

Note that due to effects of splitter jumping and reflections at different terminations of network 101, channel characteristics (e.g., attenuation and delay) for a link between two nodes may be different from the channel characteristics for a link between two other nodes. In addition, channel characteristics in a forward path may be different from channel characteristics in a reverse path. Thus, channel capacity between each source node and destination node varies from the channel capacity for two other source nodes and destination nodes. Accordingly, to appropriately use channel capacity of network 101, individual nodes of network 101 determine and store suitable separate physical (PHY) parameters tailored for each link (i.e., store separate PHY profiles for each link). Referring to FIG. 2, a logical model of network 101 is a fully-meshed collection of point-to-point links. Each link has unique channel characteristics and capacity. In addition to point-to-point communications, network 101 supports broadcast and multicast communications in which a source node uses a common set of PHY parameters that may be received by all destination nodes.

In at least one embodiment of network 101, nodes 102, 104, 106, and 108 share a physical channel. Thus, only one node is allowed to transmit at a particular time. For example, the physical channel is time division-duplexed and coordinated by a Media Access Control (MAC) data communication protocol sublayer using time division multiple access (TDMA). In at least one embodiment, network 101 is a centrally coordinated system with one node being a network-coordinator (NC). A node that is the NC transacts data on the network like any other node, but is also responsible for transmitting beacons to advertise network presence and timing, coordinating a process for admitting nodes to the network, scheduling and coordinating transmission of data among all nodes in the network, scheduling and coordinating link-maintenance operations (e.g., operations during which nodes update their physical profiles), and other functions.

Figure 3:
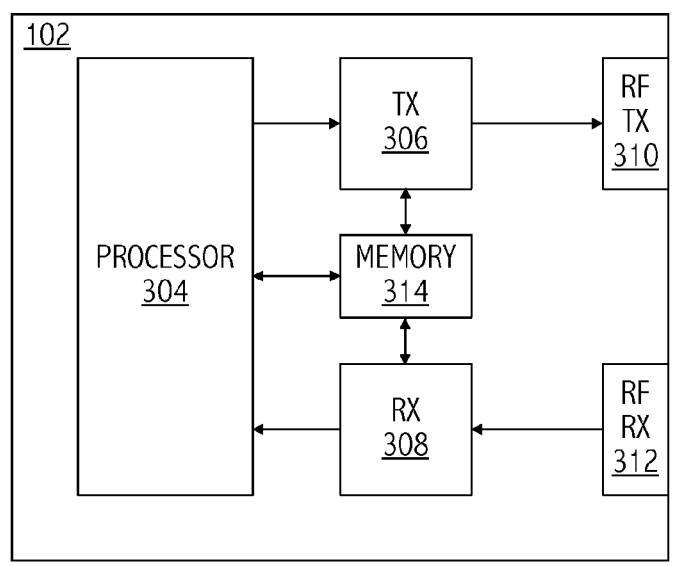
FIG. 3 illustrates a functional block diagram of an exemplary node device of the communications system of FIG. 1.

Referring to FIG. 3, an exemplary node 102 includes a processor configured to generate and process data communicated over network 101. Data to be transmitted over the network is digitally processed in transmitter 306 and transmitted over the channel using RF transmitter 310. In at least one embodiment, node 102 includes a radio frequency receiver configured to receive analog signals over the channel and to provide a baseband analog signal to the receiver path (e.g., receiver 308), which digitally processes the baseband signal to recover data and control information symbols and provide it to processor 304.

In at least one embodiment, network 101 implements orthogonal frequency division multiplexing (OFDM). In general, OFDM is a frequency-division multiplexing scheme utilized as a digital multi-carrier modulation method in which a large number of orthogonal subcarriers having closely-spaced frequencies are used to carry data. The data is divided into several parallel data streams or channels (i.e., frequency bins or bins), one for each subcarrier. Each subcarrier is modulated with a conventional modulation scheme (e.g., quadrature amplitude modulation or phase shift keying) at a low symbol rate, maintaining total data rates similar to conventional single-carrier modulation schemes in the same bandwidth. In at least one embodiment of node 102, the physical interface (e.g., transmitter 306 and receiver 308) utilizes adaptive constellation multi-tone (ACMT), i.e., node 102 pre-equalizes modulation to the frequency response of each link using bit loaded orthogonal frequency division multiplexing (OFDM). In addition, channel profiling techniques tailor the modulation for each link. In at least one embodiment of node 102, physical layer channels are approximately 50 MHz wide (i.e., the ACMT sampling rate is approximately 50 MHz) and the total number of OFDM subcarriers is 256. However, other sampling rates and numbers of subcarriers may be used. In at least one embodiment of node 102, due to DC and channel edge considerations, only 224 of the 256 subcarriers are available for typical communications.

In at least one embodiment of node 102, a modulation profile is generated based on probe packets sent between nodes and analyzed at the receiving nodes. After analysis, a receiving node assigns bits to subcarriers for a particular link and communicates this information to node 102. An individual ACMT subcarrier may be active or inactive (i.e., turned off). An active ACMT subcarrier is configured to carry one to eight bit Quadrature Amplitude Modulation (QAM) symbols. In at least one embodiment of node 102, the transmit power of a sending node is dynamically adjusted based on modulation profiling using the probe packets and based on link performance.

In general, the channel is time-varying, and link maintenance operations (LMOs) facilitate the recalculation of PHY parameters. Thus, at regular intervals a transmitting node sends one or more probe packets which are received and analyzed by receiving nodes. The receiving nodes send back probe reports to the corresponding transmitting nodes. Those probe reports may include updated parameters. In at least one embodiment of node 102, each probe packet includes a preamble and a payload. In at least one embodiment of node 102, multiple probe types are used for characterization of different network elements. In at least one embodiment of node 102, probe and/or payload packets include a preamble that includes one or more symbols used for channel estimation.

Figure 4:
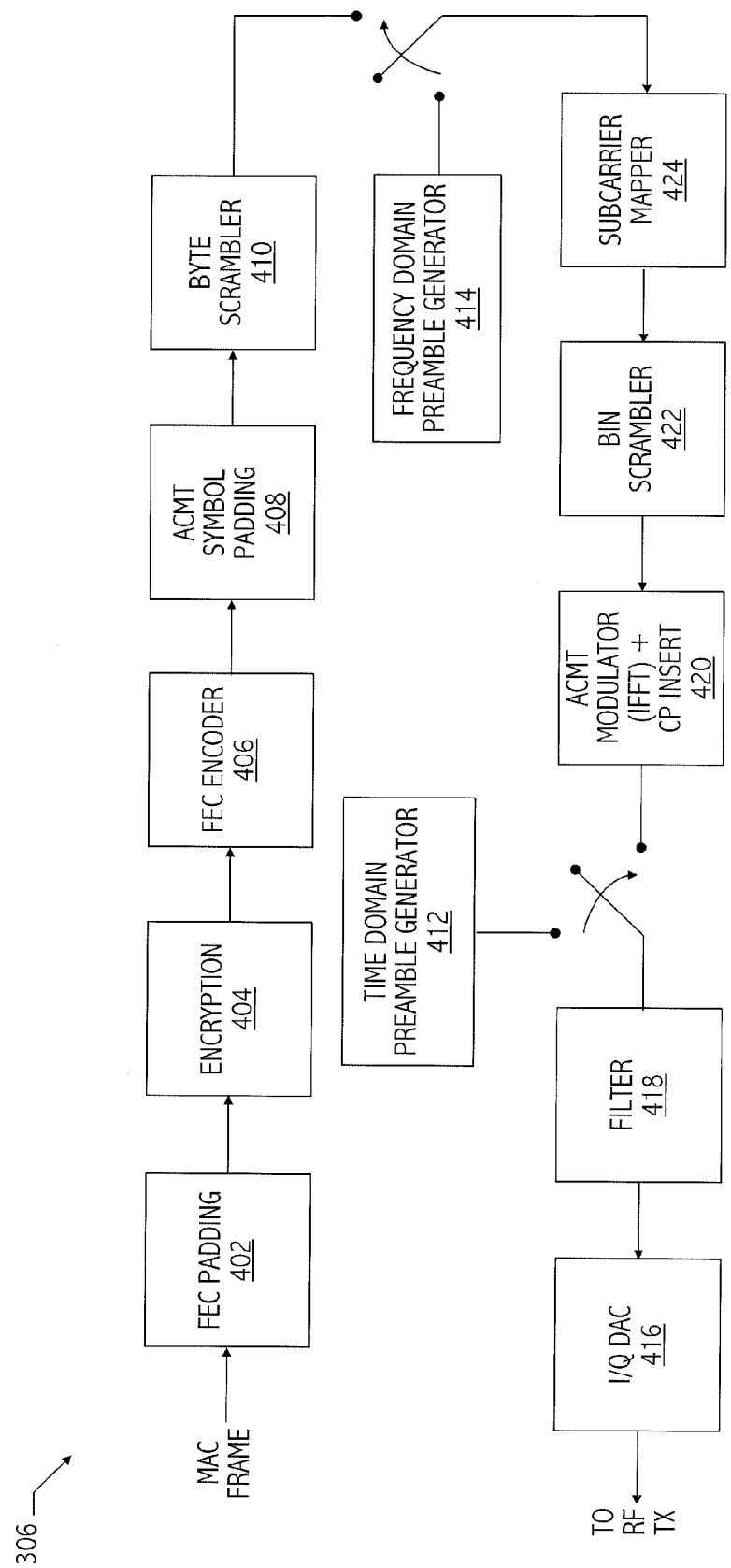
FIG. 4 illustrates a functional block diagram of an exemplary transmitter path of the node device of FIG. 3, consistent with at least one embodiment of the invention.

Referring to FIG. 4, in at least one embodiment, transmitter 306 receives a frame of data from a Medium Access Control data communication protocol sub-layer (i.e., MAC layer). In at least one embodiment of transmitter 306, a channel coding module (e.g., FEC padding module 402) encodes the MAC frame with redundancies using a predetermined algorithm to reduce the number of errors that may occur in the message and/or allow correction of any errors without retransmission. In at least one embodiment of transmitter 306, an encryption module (e.g., encryption module 404) encrypts the frame to deter eavesdropping and provide link layer privacy. In at least one embodiment, encryption module 404 implements 56-bit Data Encryption Standard (DES) encryption using a privacy key generated and received from the NC. However, in other embodiments of transmitter 306, other encryption techniques may be used.

In at least one embodiment of transmitter 306, an encoder (e.g., forward error correction (FEC) encoder 406) encodes the frame into two Reed-Solomon codewords including a regular codeword and a shortened codeword to reduce the FEC padding. Note that in other embodiments of transmitter 306, other types of forward error correction are used (e.g., other block codes or convolutional codes). In at least one embodiment of transmitter 306, a padding module (e.g., ACMT symbol padding module 408) inserts additional bits into the data to form symbols having a particular ACMT symbol size. In at least one embodiment of transmitter 306, a scrambler module (e.g., byte scrambler 410) scrambles the data across multiple bytes to change the properties of the transmitted data stream. For example, byte scrambler 410 facilitates data recovery by reducing dependence of the signal power spectrum on the actual transmitted data and/or reducing or eliminating occurrences of long sequences of '0' or '1' that may otherwise cause saturation of digital circuitry and corrupt data recovery. In at least one embodiment of transmitter 306, an ACMT subcarrier mapping module (e.g., subcarrier mapper 424) maps bits of data to ACMT subcarriers according to a predetermined bit loading profile (e.g., a bit loading profile received from a receiving node and stored in memory). In at least one embodiment of transmitter 306, the predetermined profile is selected from a plurality of predetermined profiles according to a particular mode or packet type (e.g., beacon mode, diversity mode, Media Access Plan (MAP), unicast, or broadcast) and link for transmission (e.g., a profile stored for a particular receiving node).

In at least one embodiment of transmitter 306, a scrambler module (e.g., bin scrambler 422) scrambles the data of the ACMT subcarriers to change the properties of the transmitted data stream (e.g., reduce dependence of the signal power spectrum on the actual transmitted data or to reduce or eliminate occurrences of long sequences of '0' or '1') to properties that facilitate data recovery. A modulator (e.g., ACMT modulator 420) generates the time domain in-phase and quadrature (i.e., I and Q) components corresponding to the OFDM signal. ACMT modulator 420 includes an N-point IFFT and inserts a cyclic prefix to the modulated data (i.e., inserts the cyclic prefix to time domain symbols). For example, ACMT modulator 420 copies the last $N_{CP}$ samples of the IFFT output (e.g., N samples) and prepends those samples to the IFFT output to form an OFDM symbol output (e.g., $N+N_{CP}$ samples). The cyclic prefix is used as a guard interval to reduce or eliminate intersymbol interference from a previous symbol and also to facilitate linear convolution of the channel to be modeled as a circular convolution, which may be transformed to the frequency domain using a discrete Fourier transform. This approach allows for simple frequency-domain processing, such as for channel estimation and equalization. The length of the cyclic prefix is chosen to be at least equal to the length of the multipath channel. In at least one embodiment of transmitter 408, filter 418 limits the frequency band of the signal to a signal having a particular spectral mask prior to digital-to-analog conversion (e.g., by digital-to-analog converter 416) and limits any frequency modulation to a higher frequency band (e.g., from baseband to one of four frequency bands in the range of 850 MHz to 1525 MHz at 25 MHz increments) for transmission.

Depending upon a particular communication type, in at least one embodiment of transmitter 306, frequency domain preamble generator 414 or time domain preamble generator 412 inserts a preamble into the packet prior to processing a MAC frame of data. For example, rather than processing a MAC frame through the portion of the transmitter path including FEC padding module 402, encryption module 404, FEC encoder 406, ACMT symbol padding module 408, and byte scrambler 410, an alternate source (e.g., frequency domain preamble generator 414) provides a plurality of frequency domain preamble symbols, including one or more frequency domain symbols (e.g., which are generated or retrieved from a storage device) to subcarrier mapper 424. Subcarrier mapper 424 maps bits of those frequency domain preamble symbols to individual subcarriers. Those frequency domain preamble symbols are then processed by the remainder of transmitter 306 (e.g., bit scrambled, ACMT modulated, filtered, and converted to an analog signal) and sent to RF TX 310 for transmission. The frequency domain preamble symbols provide a reference signal that may be used by the receiver for timing and frequency offset acquisition, receiver parameter calibration, and PHY payload decode. In at least one embodiment of transmitter 306, frequency domain preamble generator 414 provides a plurality of channel estimation frequency domain symbols (e.g., two channel estimation symbols) to subcarrier mapper 424, bin scrambler 422, ACMT modulator 420, filter 418, and DAC 416. In at least one embodiment of transmitter 306, time domain preamble generator 412 inserts a plurality of time domain symbols directly to filter 418 for digital-to-analog conversion and then transmission over the link. The time domain preamble symbols provide a reference signal that may be used by the receiver to identify packet type and for coarse timing and frequency offset acquisition.

Figure 5:
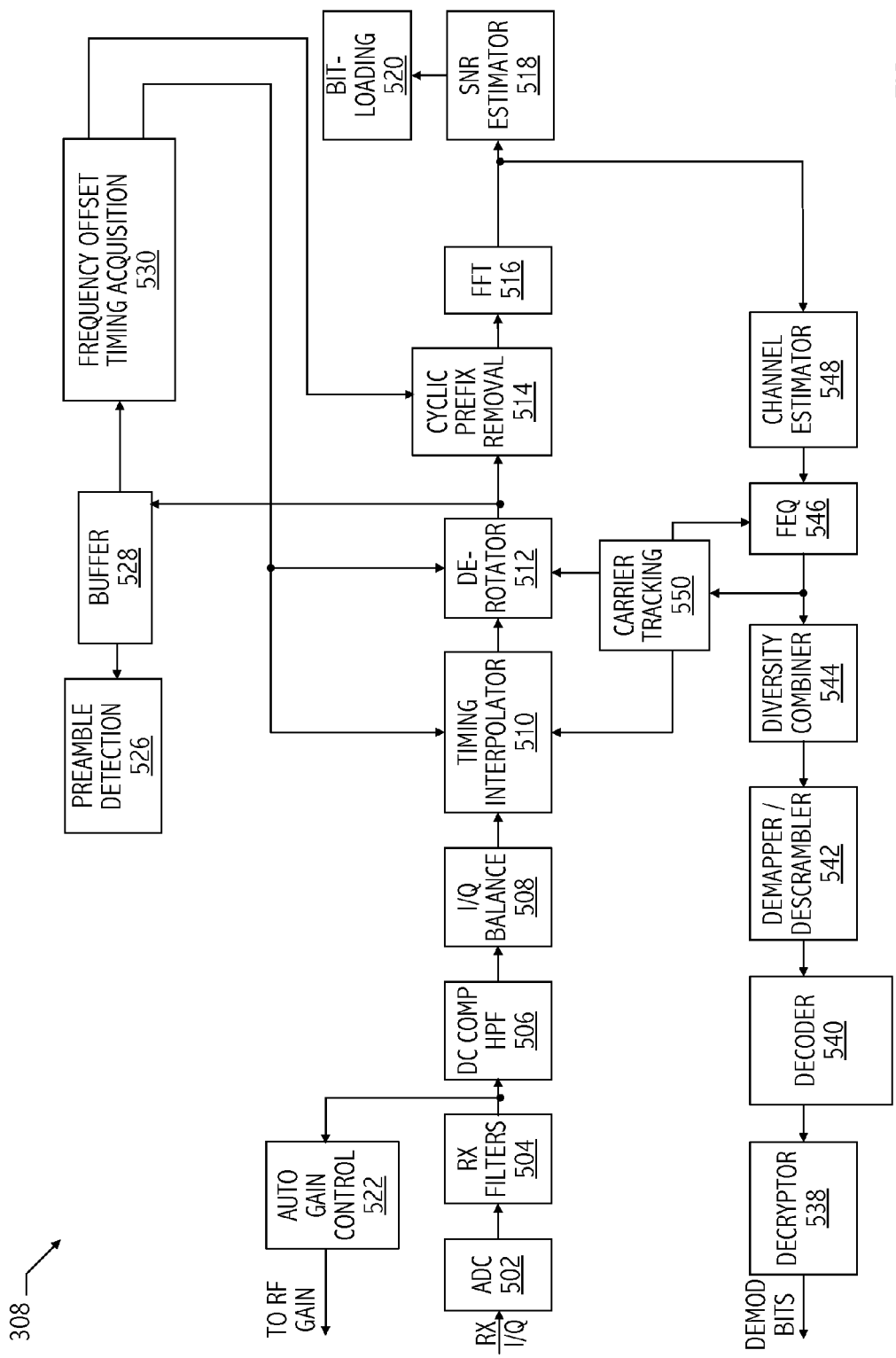
FIG. 5 illustrates a functional block diagram of an exemplary receiver path of the node device of FIG. 3, consistent with at least one embodiment of the invention.

Referring to FIG. 5 in at least one embodiment, receiver 308 receives an analog signal from the RF receiver interface (e.g., RF receiver 312 of FIG. 3) and analog-to-digital converter (e.g., ADC 502) converts in-phase and quadrature analog signal components of the received signal into a complex digital signal. Referring back to FIG. 5, in at least one embodiment of receiver 308, one or more filters (e.g., RX filters 504) limit the complex digital signal to a baseband signal having a particular bandwidth. In at least one embodiment of receiver 308, one or more other filters (e.g., high-pass filter 506) attenuates or removes a DC component of the complex digital signal. In at least one embodiment of receiver 308, I/Q balance module 508 adjusts the real and imaginary components of the complex baseband signal, which are balanced at the transmitting node, but become unbalanced after transmission over the channel by analog circuitry and due to any imbalance introduced by RF receiver 312. I/Q balance module 508 adjusts the in-phase and quadrature components of the complex baseband signal to have approximately the same gain. In at least one embodiment of receiver 308, a timing module (e.g., timing interpolator module 510) adjusts the sample timing based on a timing offset, e.g., by using a delay filter to interpolate samples and generate an output sample having a particular timing based on the timing offset. In at least one embodiment of receiver 308, a frequency offset correction module (e.g., de-rotator module 512) compensates for any frequency offset e.g., by performing a complex multiply of the received data with a complex data value based on a previously determined target angle of rotation that compensates for the frequency offset. In at least one embodiment of receiver 308, a module (e.g., cyclic prefix removal module 514) strips a number of samples (e.g., $N_{CP}$ samples, where $N_{CP}$ is the number of samples inserted by the transmitter as the cyclic prefix) from the de-rotated data symbol and provides the resulting time domain symbol to a demodulator (e.g., fast Fourier transform (FFT) module 516), which generates frequency domain symbols.

In at least one embodiment of receiver 308, during data demodulation and decode sequences, a frequency domain equalizer (e.g., FEQ 546) reduces effects of a bandlimited channel using frequency domain equalizer taps generated by a channel estimation module (e.g., channel estimator 548), as described further below. In at least one embodiment of receiver 308, during data demodulation and decode sequences that communicate in a diversity mode (e.g., a mode in which the same signal is transmitted by multiple subcarriers) diversity combiner module 544 combines signals repeated on multiple subcarriers into a single improved signal (e.g., using a maximum ratio combining technique). In at least one embodiment of receiver 308, frequency domain symbols are demapped from the subcarriers and descrambled (e.g., using demapper/descrambler module 542) according to a technique consistent with the mapping and scrambling technique used on a transmitting node. The demapped and descrambled bits are decoded (e.g., using decoder 540) consistent with coding used by a transmitting node. A decryption module (decryptor 538) recovers demodulated bits and provides them to a processor for further processing.

In at least one embodiment of receiver 308, carrier tracking module 550 uses a pilot subcarrier ($n_P$) that carries known training data to synchronize the frequency and phase of the receiver clock with the transmitter clock. A typical pilot tone transmitted from the source node has only a real component (i.e., the imaginary component is zero), and the imaginary part of the complex output of subcarrier np from the FFT is input to a feedback loop on the receiver. That feedback loop is configured to adjust the receive clock signal to drive to zero the recovered imaginary part of the pilot tone. The imaginary part of the complex output of subcarrier np from the FFT is input to a loop filter, which via a digital-to-analog converter delivers a digital control signal to de-rotator 512 and timing interpolator 510. However, in other embodiments of receiver 308, the output of the loop filter is a control voltage that is provided to a VCXO that adjusts the frequency of the receive clock. In at least one embodiment of receiver 508, rather than dedicating one or more subcarriers to being pilot tones that carry known data, a carrierless tracking technique is used to generate an indicator of frequency offset that is used to adjust the frequency of the receive clock.

In at least one embodiment of receiver 308, during timing and frequency acquisition sequences, a gain control module (e.g., automatic gain control module 522) provides power adjustment signals to monotonically adjust analog gain of the RF receiver interface (RF receiver 312 of FIG. 3) using adjustments in a particular range and step size. Referring back to FIG. 5, in at least one embodiment of receiver 308, during timing and frequency acquisition sequences, the output of de-rotator 512 is stored in a storage device (e.g., buffer 528). The stored data is used to detect a preamble of a packet (e.g., using preamble detection module 526). In at least one embodiment, a frequency offset and timing acquisition module (e.g., frequency offset and timing acquisition module 530) generates an indication of a start of a symbol and an indication of a frequency offset for use by the receiver for recovery of subsequent received symbols (e.g., timing interpolator 510, de-rotator 512, and cyclic prefix removal module 514).

In at least one embodiment of receiver 308, during channel estimation sequences (e.g., during receipt of symbols of a probe signal) a signal-to-noise ratio (SNR) estimator (e.g., SNR estimator 518) generates an SNR estimate based on multiple frequency domain symbols. A bit loading module (e.g., bit loading module 520) assigns a number of bits for transmission over individual subcarriers of the OFDM channel based on the SNR estimate. For example, bit loading module 520 turns off an individual subcarrier or assigns a one to eight bit QAM symbol to the individual subcarrier. In general, bit loading module 520 generates a bit allocation for each subcarrier of an OFDM signal and receiver 308 communicates those bit loading assignments to a transmitting node for a particular link for generating packets for communication during data communications intervals. In addition, the resulting bit loading is stored in receiver 308 for data recovery during subsequent communications sequences. Note that transmitter 306 and receiver 308 are exemplary only and other transmitters and receivers consistent with teachings herein exclude one or more modules or include one or more additional modules in the transmit and receive paths, respectively.

In general, FEQ 546 reduces effects of a bandlimited channel by equalizing the channel response. In at least one embodiment of receiver 308, a payload packet received over a particular link includes a preamble portion that includes one or more symbols for channel estimation. A typical channel estimation symbol is generated at a transmitting node associated with the particular link using a pseudorandom number generator obtained from a storage device or generated using another suitable technique. In at least one embodiment of receiver 308, channel estimator 548 estimates the channel response based on received channel estimation symbols. Channel estimator 548 determines frequency domain equalizer coefficients for the link based on that estimated channel response (i.e., channel response estimate) and provides the frequency domain equalizer coefficients to FEQ 546 for use during data demodulation and decode sequences.

In at least one embodiment, FEQ 546 is a transversal or tapped-delay-line filter having tap weights determined by channel estimator 548 based on channel conditions associated with the link. A zero-forcing technique for generating the filter tap weights approximates the inverse of the channel with a linear filter to reduce the intersymbol interference to zero in the absence of noise. Such equalization technique is useful when the intersymbol interference is significantly larger than noise. However, at some frequencies, the received signal may be weak and the resulting gain of the zero-forcing filter is very large, which amplifies noise by a large factor and degrades the overall signal-to-noise ratio. In addition, any nulls in the frequency response of the channel cannot be inverted.

In at least one embodiment, channel estimator 548 generates tap weights for FEQ 546 using a minimum mean-square error (MMSE) technique, which, rather than eliminating intersymbol interference, bases the filter taps on a minimum of a total power of noise and intersymbol interference components in an output signal. In at least one embodiment of receiver 308, channel estimator 548 generates a single tap filter having complex coefficients for each subcarrier.

In at least one embodiment of receiver 308, channel estimator 548 updates the frequency domain equalizer coefficients on a packet-by-packet basis. For example, referring to FIG. 6, a packet preamble includes a channel estimation sequence. The channel estimation sequence includes a cyclic prefix and two received symbols corresponding to identical channel estimation transmit symbols that are transmitted sequentially (e.g., CES1[n] and CES2[n]) over the link. Channel estimator 548 uses those symbols to generate a channel response estimate, H[k], and to generate a noise variance estimate, $\sigma_n$, for the link.

In general, if noise on the channel is not colored (i.e., the noise can be modeled as additive white Gaussian noise), a channel estimator generates a suitable noise variance estimate $\sigma_n$ by averaging the noise power over all subcarriers and applying the same value of $\sigma_n$ to every subcarrier. However, if the noise is colored, a single average noise power is an unreliable estimate and the equalizer taps generated by the channel estimator will not provide sufficient equalization for all frequency bins. If instead, the channel estimator uses a separate noise estimate for each subcarrier, $\sigma_n[k]$, the resulting noise estimate will have a large noise variance. A large noise variance indicates that the associated estimate for the packet will be inaccurate and an associated MMSE computation generates sub-optimal FEQ coefficients, which degrade performance over the course of a packet and may increase the bit error rate. Accordingly, a technique for generating equalizer taps bases the equalizer taps on representative noise variance estimates for intervals of subcarriers and excludes noise variance estimates from particular subcarriers from the determination of the noise variance estimate for those particular subcarriers.

Figures 6, 7A:
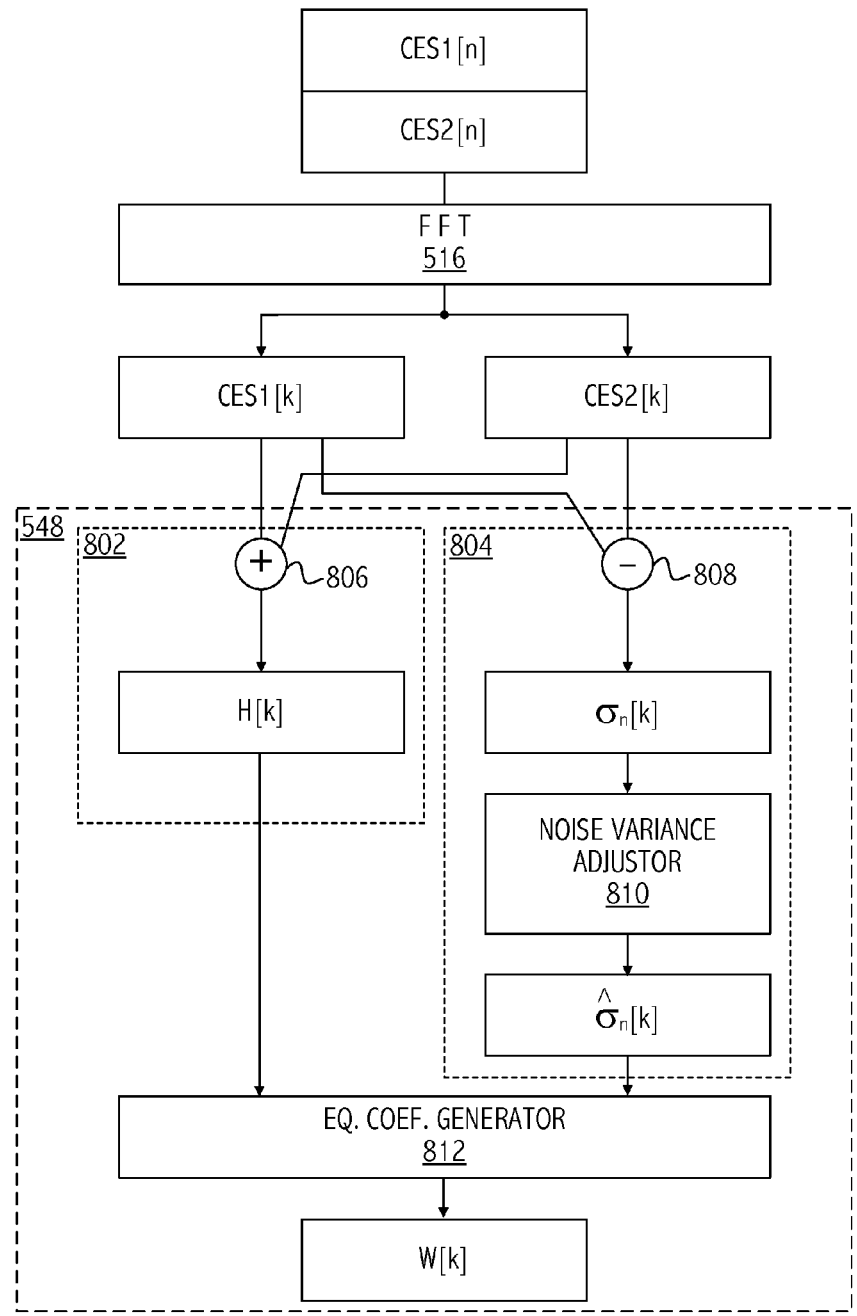
FIG. 6 illustrates an exemplary portion of a packet received by the node device of FIG. 3.
FIG. 7A illustrates a functional block diagram of a channel estimation module of FIG. 5 consistent with at least one embodiment of the invention.
Figure 7B:
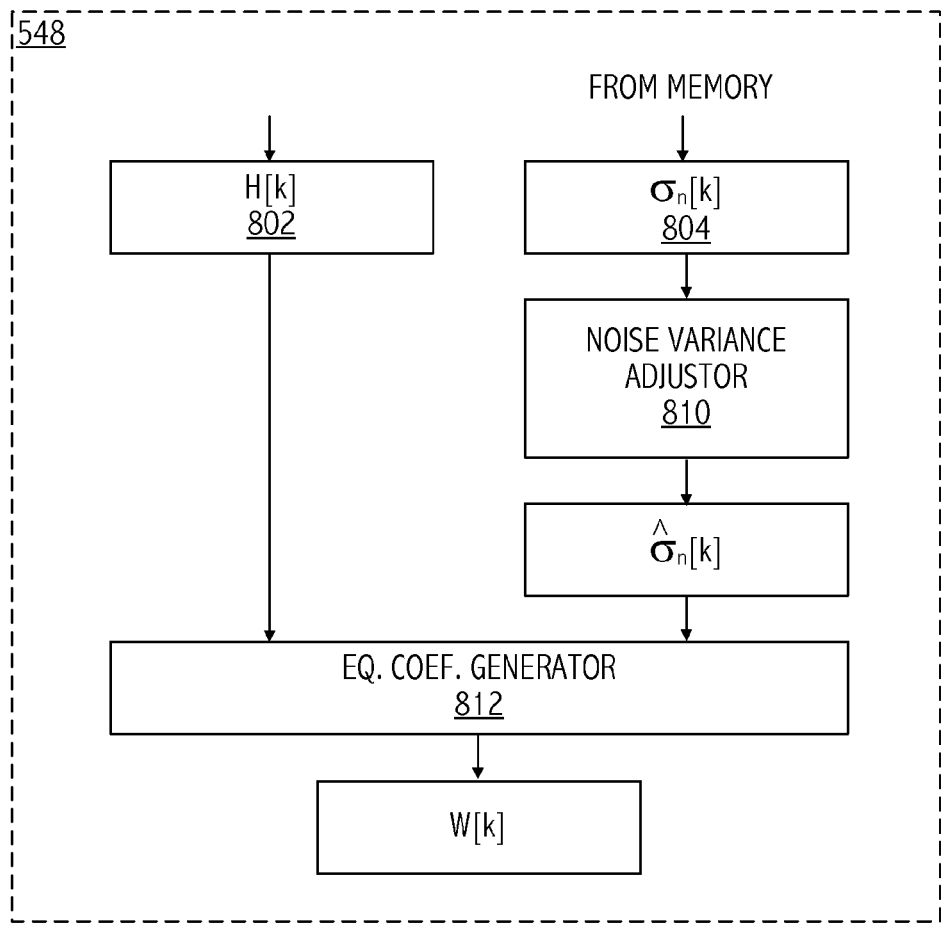
FIG. 7B illustrates a functional block diagram of a channel estimation module of FIG. 5 consistent with at least one embodiment of the invention.
Figure 8:
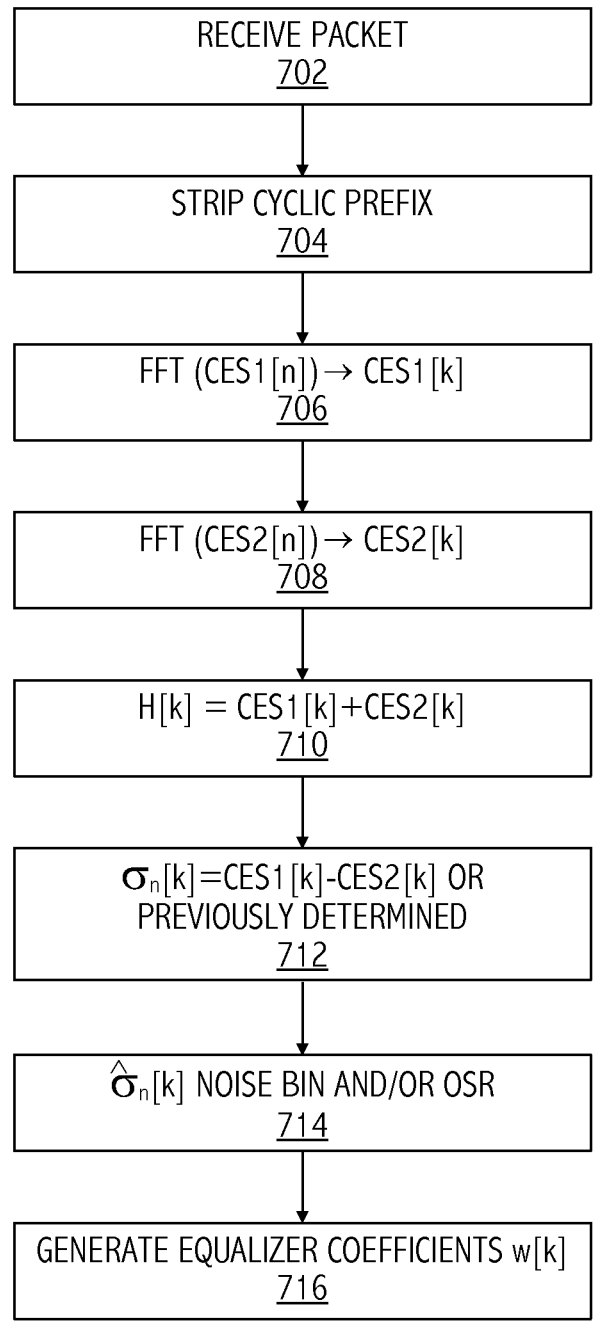
FIG. 8 illustrates information and control flows of the channel estimation module of FIG. 5 consistent with at least one embodiment of the invention.

Referring to FIGS. 7A, 7B, and 8, in at least one embodiment, receiver 308 receives a packet including received symbols corresponding to a repeatedly transmitted CES symbol in the preamble (702). After cyclic prefix removal (704), FFT module 516 separately demodulates the two received versions of the CES symbol (e.g., CES1[n] and CES2[n]) to generate corresponding frequency domain versions of the repeated symbol, CES1[k] (706) and CES2[k] (708). In at least one embodiment, channel estimator 548 includes channel estimate generator 802, which generates a channel estimate as a function of subcarrier frequency, H[k] (710). In at least one embodiment, channel estimate generator 802 sums channel estimate values of CES1[k] and CES2[k] for corresponding subcarriers (e.g., using adder 806) to generate channel estimate values as a function of subcarrier frequency, which are provided to equalizer coefficient generator 812. Note that H[k] may be determined by other suitable techniques.

In embodiments consistent with FIG. 7A, channel estimator 548 includes noise variance estimate generator 804, which generates noise variance estimate as a function of subcarrier frequency, $\hat{\sigma}_n[k]$. In at least one embodiment, noise variance estimate generator 804 subtracts values of CES1[k] and CES2[k] for corresponding subcarriers (e.g., using subtracter 808) to generate noise variance estimate values as a function of subcarrier frequency, $\sigma_n[k]$ (712). Referring to FIG. 7B, an alternate embodiment of channel estimator 548, rather than basing the noise variance estimate on repeated transmissions of a CES symbol received in the preamble of a packet, a noise estimate that is previously generated (e.g., a noise estimate as a function of subcarrier frequency generated during a signal-to-noise ratio calculation based on received probe sequences) is retrieved from a storage structure and provided to equalizer coefficient generator 812. Referring to FIGS. 7A, 7B, and 8, noise variance estimate adjustment module (e.g., noise variance adjustor 810) applies noise binning and/or outer subcarrier removal techniques to the noise variance estimate values as a function of subcarrier frequency, $\sigma_n[k]$, to generate adjusted noise variance estimate values as a function of subcarrier frequency, $\hat{\sigma}_n[k]$ (714).

In at least one embodiment of channel estimator 548, equalizer coefficient generator 812 generates FEQ coefficients for each subcarrier frequency. That is, channel estimator 548 generates an FEQ tap, $w_k$, for each subcarrier, k, based on $H_k$ and $\hat{\sigma}_{nk}$ (716). Individual FEQ coefficients for each subcarrier are generated based on the adjusted noise variance estimate as follows:

$$w_k = \frac{H_k^*}{|H_k|^2 + \hat{\sigma}_{nk}^2}.$$

Referring to FIGS. 7A, 7B, 8, and 9A, in at least one embodiment, channel estimator 548 applies a data binning technique that reduces effects of noise variance on the FEQ filter taps, but increases the reliability of the noise estimate. In at least one embodiment of channel estimator 548, the OFDM channel includes $N_{MAX}$ subcarriers (e.g., $N_{MAX}$=256) and noise variance adjustor 810 partitions the $N_{MAX}$ subcarriers into m=$N_{MAX}$/p intervals, of p subcarriers, where m and p are integers (e.g., m=8, p=42). However, note that $N_{MAX}$, m and p are exemplary only and other suitable partitions may be used. Noise variance adjustor 810 replaces the noise variance estimates $\sigma_n[k]$ for individual subcarriers within a frequency interval m of the channel or sub-channel with a representative noise variance estimate for that interval. That is, noise variance adjustor 810 quantizes the noise variance estimate by mapping or combining a large set of noise variance estimates to a smaller set of representative noise variance estimates and each noise variance estimate for a corresponding subcarrier of the interval is associated with the same representative noise variance estimate. For example, the noise variance values $\sigma_n[k]$ for all subcarriers of intervals 906, 908, 910, 912, 914, 916, 918, and 920, are replaced with noise variance values $\sigma_{n906}$, $\sigma_{n908}$, $\sigma_{n910}$, $\sigma_{n912}$, $\sigma_{n914}$, $\sigma_{n916}$, $\sigma_{n918}$, and $\sigma_{n920}$, respectively.

In at least one embodiment, noise variance adjustor 810 determines an individual representative noise variance estimate based on a statistical mean, mode, or median or maximum of the noise variance estimates for the subcarriers of the frequency interval, based on a noise variance estimate for the highest frequency subcarrier, lowest frequency subcarrier, or center frequency subcarrier of the frequency interval, or based on another suitable relationship. In least one embodiment of noise variance adjustor 810, the values of m and p are predetermined. In alternate embodiments, noise variance adjustor 810 determines m and p or otherwise partitions the subcarriers into intervals based on the noise spectrum and a trade-off of noise variance and representation of the noise variance. For example, if the noise is completely uncorrelated (i.e., Gaussian), noise variance adjustor 810 uses a single interval that spans the entire spectrum and all subcarriers are averaged across that interval to generate a noise estimate. However, where noise correlation exists, noise variance adjustor 810 increases interval resolution. That is, noise variance adjustor 810 uses multiple intervals and generates multiple corresponding noise estimates where individual intervals include subcarriers with correlated noise.

Figure 9A:
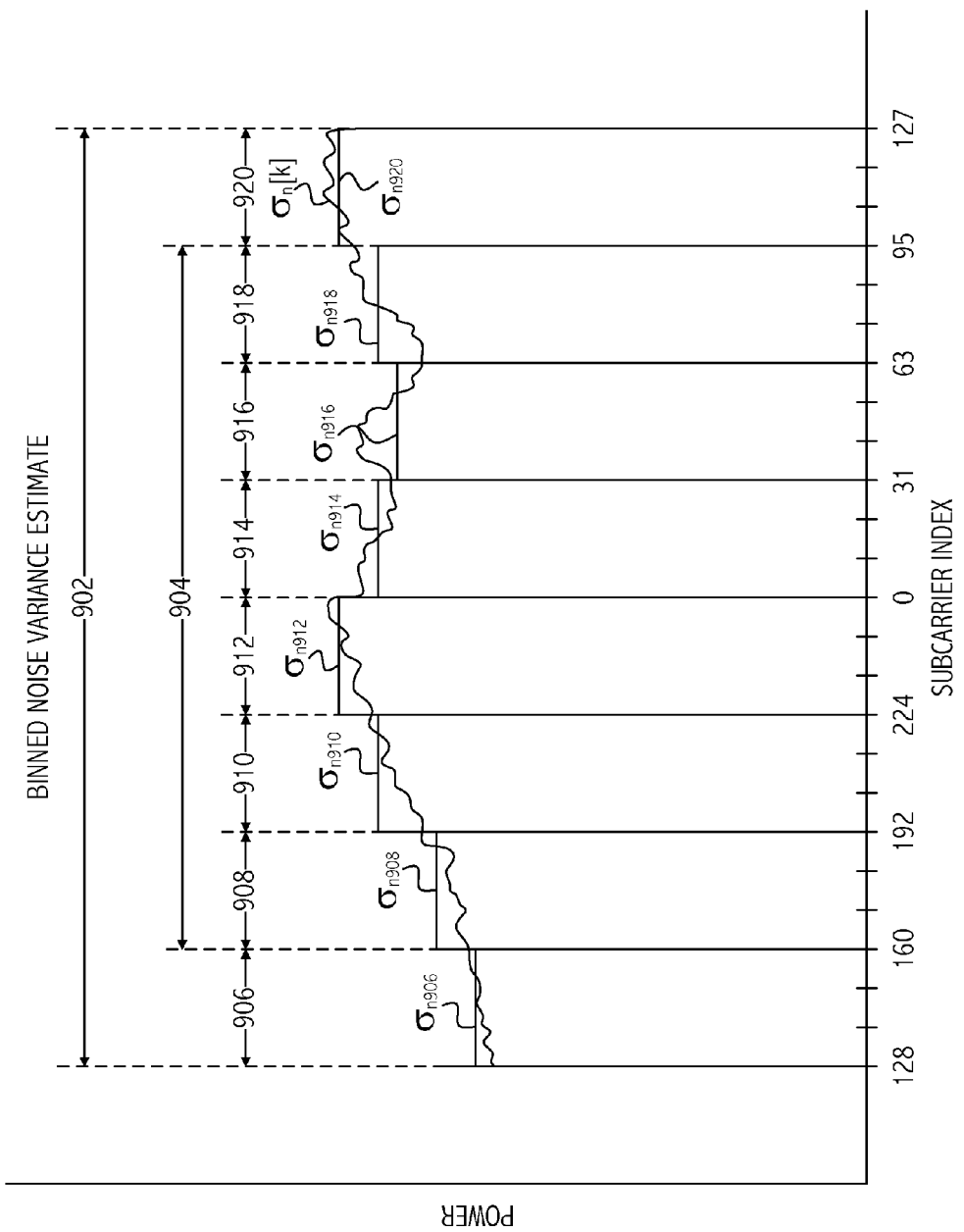
FIG. 9A illustrates a graphical representation of an adjusted noise variance estimate generated by a channel estimation module of FIG. 5 consistent with at least one embodiment of the invention.
Figure 9B:
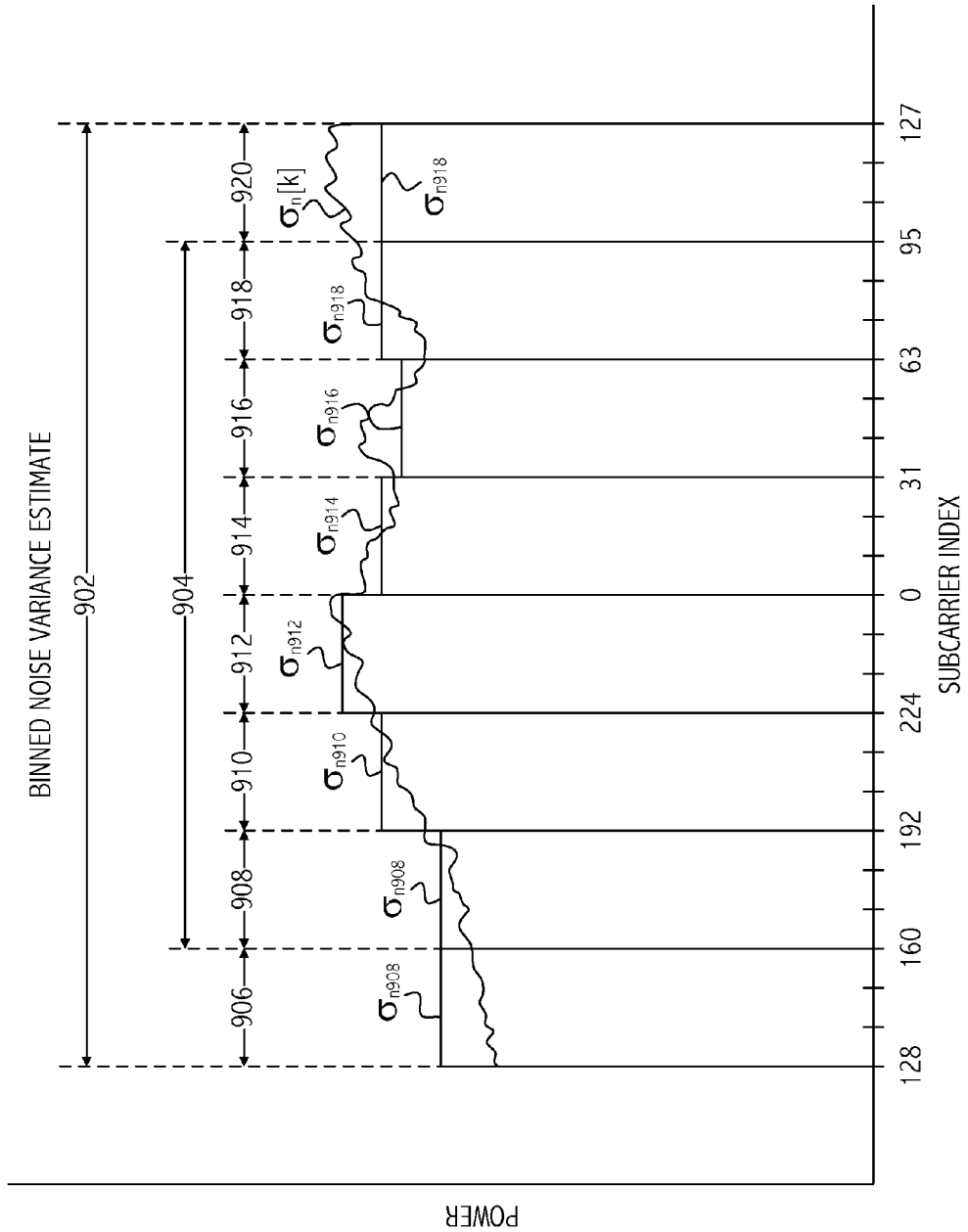
FIG. 9B illustrates a graphical representation of an adjusted noise variance estimate generated by a channel estimation module of FIG. 5 consistent with at least one embodiment of the invention.

Referring to FIG. 9B, in at least one embodiment, noise variance adjustor 810 excludes noise variance estimates from particular subcarriers. In at least one embodiment, noise variance adjustor 810 excludes subcarriers of a baseband signal that are closest to cutoff frequencies of receiver filters 504 (i.e., outer subcarriers) since those noise variance estimates may be distorted by the filter response. For example, channel estimator 548 excludes the individual noise variance estimates for a programmable number of one or more outer subcarriers (e.g., subcarrier index 127 of the last interval and subcarrier index 128 of the first interval) from the determination of the representative noise variance estimate. In at least one embodiment, channel estimator 548 excludes the noise variance estimates for an entire outer frequency interval (e.g., subcarriers of interval 906 or subcarriers of interval 920) from the determination of the representative noise variance estimates. A representative noise variance estimate, determined based on a noise variance estimate for a next adjacent, non-excluded subcarrier, is used to represent the noise variance estimate of one or more excluded subcarrier(s). In at least one embodiment of channel estimator 548, the representative noise variance estimate for a next adjacent interval is used to represent the noise variance estimate for the subcarriers of an excluded interval. For example, $\sigma_n[k]$ for all subcarriers of intervals 906, are replaced with noise variance values $\sigma_{n308}$. Although noise variance adjustor 810 is described as excluding noise variance estimates corresponding to the outer subcarriers, in at least one embodiment of noise variance adjustor 810, the subcarriers for exclusion from the noise variance estimate are programmable and any frequency subcarrier and any number of subcarriers may be selected for exclusion from the noise variance estimate. Use of the data binning and/or carrier exclusion techniques described herein improves the frequency domain equalization of a receiving node device, thereby reducing the associated bit error rate.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in embodiments in which a receiver receives OFDM communications over a channel including coaxial cable, one of skill in the art will appreciate that the teachings herein can be utilized with devices consistent with other OFDM communications over channels including other wireline or wireless channels. Variations and modifications of the embodiments disclosed herein, may be made based on the description set forth herein, without departing from the scope and spirit of the invention as set forth in the following claims.

What is claimed is:

1. A method comprising:
   generating a plurality of noise variance estimates based on a plurality of received symbols received in an orthogonal frequency division multiplexing (OFDM) signal, each of the plurality of noise variance estimates corresponding to a respective frequency subcarrier of a plurality of frequency subcarriers of the OFDM signal;
   partitioning the plurality of frequency subcarriers of the OFDM signal into a plurality of frequency intervals, each frequency interval of the plurality of frequency intervals including a plurality of contiguous frequency subcarriers of the OFDM signal, the partitioning being based on noise correlation between contiguous frequency subcarriers of the OFDM signal; and
   providing a representative noise variance estimate for each frequency interval of the plurality of frequency intervals.

2. The method, as recited in claim 1, wherein the noise variance estimates are further based on a difference between frequency domain versions of first and second received symbols of the plurality of received symbols.

3. The method, as recited in claim 1, wherein each representative noise variance estimate of the representative noise variance estimates is based on an individual noise variance estimate corresponding to an associated frequency subcarrier of the respective frequency interval.

4. The method, as recited in claim 1, further comprising:
   generating frequency domain equalizer coefficients based on the representative noise variance estimates; and
   filtering frequency domain versions of received symbols based on the frequency domain equalizer coefficients.

5. The method, as recited in claim 4, further comprising:
   generating a channel response estimate based on the plurality of received symbols,
   wherein the frequency domain equalizer coefficients are further based on the channel response estimate.

6. The method, as recited in claim 5, wherein the channel response estimate is based on a sum of frequency domain versions of received symbols of the plurality of received symbols.

7. The method, as recited in claim 4, further comprising:
   generating a channel response estimate based on another plurality of symbols received in the OFDM signal,
   wherein the frequency domain equalizer coefficients are further based on the channel response estimate.

8. The method, as recited in claim 1, wherein generating the representative noise variance estimates comprises:
   determining, for an interval of outer frequency subcarriers of the plurality of frequency intervals, a representative noise variance estimate of the representative noise variance estimates, the representative noise variance estimate being based on a noise variance estimate associated with a frequency interval adjacent to the interval of outer frequency subcarriers.

9. The method, as recited in claim 1, wherein the representative noise variance estimate for an interval of the plurality of frequency intervals is based on one of a statistical mean, a statistical mode, and a statistical median of the noise variance estimates for the subcarriers of the frequency interval.

10. The method, as recited in claim 1, wherein the representative noise variance estimate for an interval of the plurality of frequency intervals is based on a maximum of the noise variance estimates for the subcarriers of the frequency interval.

11. The method, as recited in claim 1, wherein the representative noise variance estimate for an interval of the plurality of frequency intervals is a noise variance estimate for one of the highest frequency subcarrier, lowest frequency subcarrier, and center frequency subcarrier of the frequency interval.

12. The method, as recited in claim 1, wherein noise of each subcarrier included in a frequency interval of the plurality of frequency intervals is correlated with noise of other subcarriers included in the frequency interval.

13. A receiver comprising:
   a noise variance estimator configured to generate a plurality of noise variance estimates based on a plurality of received symbols received in an orthogonal frequency division multiplexing (OFDM) signal, each of the plurality of noise variance estimates corresponding to a respective frequency subcarrier of a plurality of frequency subcarriers of the OFDM signal;
   a noise variance estimate adjustor configured to partition the plurality of frequency subcarriers of the OFDM signal into a plurality of frequency intervals, each frequency interval of the plurality of frequency intervals including a plurality of contiguous frequency subcarriers of the OFDM signal, the frequency subcarriers being partitioned based on noise correlation between contiguous frequency subcarriers of the OFDM signal, the noise variance estimate adjustor being further configured to provide a representative noise variance estimate for each interval of the plurality of frequency intervals; and
   a frequency equalizer coefficient generator configured to generate frequency domain equalizer coefficients based on the representative noise variance estimates.

14. The receiver, as recited in claim 13, wherein the noise variance estimates are based on a difference between frequency domain versions of first and second received symbols of the plurality of received symbols.

15. The receiver, as recited in claim 13, further comprising:
   a channel response estimator configured to generate a channel response estimate based on the plurality of symbols received in the OFDM signal.

16. The receiver, as recited in claim 13, further comprising:
   a channel response estimator configured to generate a channel response estimate based on another plurality of symbols received in the OFDM signal.

17. The receiver, as recited in claim 13, wherein the noise variance estimator is further configured to generate noise variance estimates based on a predetermined frequency window, the noise variance estimates including an individual noise variance estimate for each frequency subcarrier of the OFDM signal.

18. The receiver, as recited in claim 13, wherein the noise variance estimate adjustor is configured to assign a representative noise variance estimate value to a set of outer subcarriers of the OFDM frequency subcarriers, the representative noise variance estimate value being based on a noise variance associated with a subcarrier adjacent to the set of outer subcarriers.

19. The receiver, as recited in claim 13, further comprising:
   a frequency-domain equalizer configured to filter a frequency-domain version of a received signal using the frequency domain equalizer coefficients.

20. The receiver, as recited in claim 13, wherein the representative noise variance estimate for an interval of the plurality of frequency intervals is based on one of a statistical mean, a statistical mode, and a statistical median of the noise variance estimates for the subcarriers of the frequency interval.

21. The receiver, as recited in claim 13, wherein noise of each subcarrier included in a frequency interval of the plurality of frequency intervals is correlated with noise of other subcarriers included in the frequency interval.

22. An apparatus comprising:
means for generating a plurality of noise variance estimates based on a plurality of received symbols received over an orthogonal frequency division multiplexing (OFDM) signal, each of the plurality of noise variance estimates corresponding to a respective frequency subcarrier of a plurality of frequency subcarriers of the OFDM signal;
means for partitioning the plurality of frequency subcarriers of the OFDM signal into a plurality of frequency intervals, each frequency interval of the plurality of frequency intervals including a plurality of contiguous frequency subcarriers of the OFDM signal, the partitioning being based on noise correlation between contiguous frequency subcarriers of the OFDM signal and for providing a representative noise variance estimate for each interval of the plurality of frequency intervals; and
means for generating frequency domain equalizer coefficients based on the representative noise variance estimates.

* * * * *